United States Patent [19]

Etter et al.

[11] Patent Number: 4,959,477
[45] Date of Patent: Sep. 25, 1990

[54] OPTICALLY NONLINEAR PYRIDINE-N-OXIDE COMPLEXES

[75] Inventors: Margaret C. Etter, St. Paul; Gayle M. Frankenbach, Minneapolis; Thomas W. Panunto, St. Paul, all of Minn.

[73] Assignee: Regents of the University of Minnesota, Minneapolis, Minn.

[21] Appl. No.: 312,364

[22] Filed: Feb. 14, 1989

Related U.S. Application Data

[62] Division of Ser. No. 124,886, Nov. 24, 1987.

[51] Int. Cl.$^5$ .................................. C07D 213/89
[52] U.S. Cl. ..................................... 546/307
[58] Field of Search .......................... 546/304, 307

[56] References Cited

U.S. PATENT DOCUMENTS

| | | | |
|---|---|---|---|
| 3,584,230 | 6/1971 | Tien | 307/88.3 |
| 3,965,375 | 6/1976 | Bergman, Jr. | 307/88.3 |
| 4,199,698 | 4/1980 | Bethea et al. | 307/425 |
| 4,737,232 | 4/1988 | Flicstein et al. | 156/610 |

OTHER PUBLICATIONS

Kreevoy, M. et al, "Ultraviolet Spectra and Structure of Complexes of Pyridine 1-Oxide and Oxygen Acids", *J. Phys. Chem.* vol. 80, No. 3 259-261 (1976).
D. J. Williams, *Angew. Chem. Int. Ed. Engl.*, 23, 690 (1984).
R. V. Vizgert et al., *Sov. J. Quantum Electron.*, 12, 214 (Feb. 1982).
J. Zyss, *J. Molec. Electronics*, 1, 25 (1985).
K. A. Jackson et al., *J. Cryst. Growth*, 42, 364 (1977).
D. A. Kleinman et al., *Phys. Review*, 145, 338 (1966).
M. Shiro et al., *Chem. Letters*, 1151 (1972).
J. R. Lechat, *Acta Cryst.*, A40, C-264 (1984).
J. R. Lechat, *Acta Cryst.*, B37, 1468 (1981).

*Primary Examiner*—Mary C. Lee
*Assistant Examiner*—Jacqueline Haley
*Attorney, Agent, or Firm*—Merchant, Gould, Smith, Edell, Welter & Schmidt

[57] ABSTRACT

Compounds capable of second harmonic generation are provided for use in a nonlinear optical device, in combination, a harmonic-generating medium, means for introducing coherent radiation into said harmonic-generating medium, and means for utilizing the coherent radiation emitted from said medium, wherein said medium consists essentially of a crystalline body of a compound of the formula:

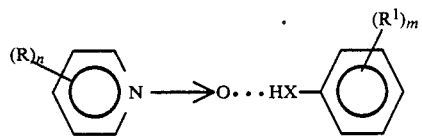

wherein n is about 0-5, m is about 0-5, $R^1$ is individually $-NO_2$, $-OR^2$, $-CH$, $-NR^2R^3$, $(C_1-C_5)$alkyl, $-CO_2H$, halo,

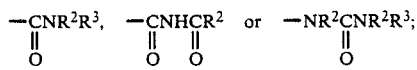

R is individually $-NO_2$, $-CH_3$, $-OR^2$, $-NR^2R^3$, $-CN$,

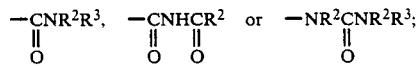

and X is $-O-$, $-S-$, $-N(R^2)-$,

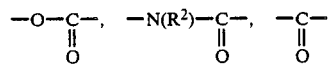

or $-C\equiv C-$; and wherein $R^2$ and $R^3$ are individually H, $(C_1-C_5)$alkyl, aryl or ar$(C_1-C_5)$alkyl.

36 Claims, 1 Drawing Sheet

OPTICALLY NONLINEAR PYRIDINE-N-OXIDE COMPLEXES

GRANT INFORMATION

This invention was made with the support of Grant No. N00014-86-K-0660, awarded by the Office of Naval Research. The Government has certain rights in the invention.

This is a division of application Ser. No. 124,886 filed Nov. 24, 1987.

BACKGROUND OF THE INVENTION

A nonlinear optical material is one that gives a nonlinear optical response when exposed to intense radiation. When exposed to normal light, such optical properties as the refractive indices of materials change linearly with light intensity. But when the intensity is great enough, as with laser light, these properties can vary as the square, cube or higher power of an applied electromagnetic field; or as the product of two, three or more different fields applied at once.

This is because optical properties depend on the degree of charge separation (polarization) induced by light. Total polarization of a molecule or region of a substance by an applied electromagnetic field is the sum of all the intrinsic, first-order, second-order or higher-order polarizations:

$$P = P_o + \alpha E + \beta EE + \gamma EEE + \ldots$$

where P is the total dipole moment, $P_o$ is the intrinsic dipole moment, and $\alpha$, $\beta$ and $\gamma$ are first-, second- and third-order hyperpolarizabilities.

Such changes in the overall polarization of a material by an applied field result from all of the individual contributions to the dipole moment of a molecule or region caused by the field:

$$P = P_o + \chi^{(1)}E + \chi^{(2)}EE + \chi^{(3)}EEE + \ldots$$

where P is the total polarization, $P_o$ is the intrinsic polarization, the $\chi$s are first-, second-, third- and higher-order susceptibility coefficients, and the Es are either different electromagnetic fields or photons of the same kind.

Nonlinear optical effects take their name from their origin as powers or products of electromagnetic fields. The effects themselves are interactions of photons of light with photons of the same frequency or photons of different frequencies to produce photons of combined frequency.

The various optical linear and nonlinear susceptibilities and hyperpolarizabilities are related to the corresponding nonlinear effects and to possible applications in Table I. The microscopic entity at the origin of the nonlinear behavior would be a molecule in the case of an organic molecular crystal.

TABLE I

| Order | Crystal | Molecule | Effects | Possible Utilization |
|---|---|---|---|---|
| 1 | $\chi^{(1)}$ | $\alpha$ | refraction | optical fibres |
| 2 | $\chi^{(2)}$ | $\beta$ | generation of second harmonic $\omega + \omega \rightarrow 2\omega$ | frequency doublers |
| | | | frequency mixing $\omega_1 \pm \omega_2 \rightarrow \omega_3$ | optical mixers |

TABLE I-continued

| Order | Crystal | Molecule | Effects | Possible Utilization |
|---|---|---|---|---|
| 3 | $\chi^{(3)}$ | Y | parametric amplification $\omega_3 \rightarrow \omega_1 + \omega_2$ | optical parametric oscillators |
| | | | pockels effects $\omega + E(O) \rightarrow \omega$ | electro-optical modulators |
| | | | 4-wave mixing | Raman coherent spectroscopy |
| | | | phase gratings | real time holography |
| | | | Kerr effect | ultra high-speed optical gates |
| | | | optical bi-stability | amplifiers, amplitude choppers and logical gates |

As shown in Table I, the simplest second-order nonlinear effect is frequency doubling. Laser light enters a substance and emerges as light of double the frequency (half the wavelength). Frequency doublers could convert infrared light into visible light for easier detection of signals.

Alternatively, pumping of a substance with laser light of one frequency could cause it to lase at two different frequencies. Because the values of the two new frequencies depend on the angle at which the original beam enters the solid, adjusting the angle opens the way to tunable lasers, whose new frequencies extend their range of use.

Instead of light, one of the fields can be electrical. At one electric field and angle of incidence, the incoming light can be guided along the substance, which becomes a wave guide, in one preferred direction. Changing the frequency or angle of incidence may cause the substance to stop being a wave guide. Such behavior may lead to optical on-off switches. Other nonlinear optical effects could produce light-signal modulation or amplification.

The intensity of nonlinear optical effects decreases as the order increases. Thus, third-order effects are weaker than second-order ones. At the present time, effects of orders higher than three are too weak to be of interest for practical devices, though physicists may use them in theoretical studies. Third-order effects are useful because they are not highly dependent on ordering of molecules or regions in substances. Second-order effects are stronger, but molecules or regions must be acentric and are usually highly ordered.

Currently, the only technologically useful nonlinear optical materials are certain inorganic crystals, such as LiNbO$_3$. However, the potential of organic materials to exhibit nonlinear optical properties has been extensively investigated in recent years, and a number of polymeric and nonpolymeric organic compounds which exhibit substantial optical nonlinearities have been identified. See, D. J. Williams, *Angew. Chem. Int. Ed. Engl.*, 23, 690 (1984).

Second-order effects in organic or inorganic molecules result from enhancement of polarization in one direction and inhibition in another. For example, p-nitroaniline has a large molecular hyperpolarizability, $\beta$, due to the natural tendency for the amino group to donate electrons to the benzene pi-system and for the nitro group to accept them. The crest of a light wave passing through a molecule of para-nitroaniline may cause polarization of the molecule with the amino group donating charge and the nitro group accepting it. When the trough of the wave passes through, the influence may be to cause charge donation by the nitro group and acceptance by the amino group, which is against the nature of these structures. Thus, the response of the molecule is unsymmetrical; it is greater in one direction than the other. Para-nitroaniline is also transparent at many wave lengths of interest, including 0.532 μm, which permits frequency doubling of the commonly used 1.064 μm wavelength from a Nd:YAG laser. However, this molecule crystallizes in a centrosymmetric phase, and the second harmonic coefficients are, because of the symmetry conditions, zero.

Therefore, apart from the requirement for molecular hyperpolarizability, an organic molecule exhibiting second-order nonlinear optical effects must crystallize into a noncentric packing pattern, so that the second harmonic ($\chi^{(2)}$) can be nonzero. A number of approaches have been taken to attain this result. The use of a chiral molecule ensures formation of a noncentrosymmetrical crystal and mathematically guarantees a non-vanishing $\chi^{(2)}$, but not necessarily a large one. Another approach that is not understood, but that can work for biasing organic molecules to pack into non-centric structures, is to use polar aromatic molecules with meta-substitution patterns. For example, 2-methyl-4-nitro-aniline, as disclosed by C. G. Bethea et al. in U.S. Pat. No. 4,199,698, has a nonlinear coefficient ($d_{12}$) which is 5.8 times larger than the nonlinear coefficient ($d_{31}$) of $LiNbO_3$. It has also been reported that it is sometimes possible to obtain noncentrosymmetric crystals by cocrystallizing two similar compounds. For example, mixed crystals of para-nitroaniline and para-nitrophenol which exhibit SHG have been obtained by cocrystallization from solutions. See, *Sov. J. Quantum Electron.*, 12, 214 (1982).

If a polarizable molecule which is transparent at the desirable wavelength packs in a noncentric crystal structure, then it will yield a useful nonlinear response when two additional criteria are met. First, the crystal must be phase matchable, in that there must be a propagation direction in the crystal where the incoming light and the second harmonic waves have coherent phases. Secondly, the molecular dipole moment vector should be aligned along or near to a particular direction of the crystal, with the exact direction being determined by the space group symmetry of the crystal. Since there is no method presently available to control either of these factors, the preparation of new organic crystals which exhibit nonlinear optical properties such as second harmonic generation remains a largely empirical art.

Therefore, although considerable progress has been made, both in understanding the electronic origins of molecular nonlinearities in organic π systems, as well as in the hindsight explanation of the quantitative relationship of the molecular arrangements in a crystal to the observed nonlinearities, a need exists for new compounds having optimized nonlinear optical properties.

SUMMARY OF THE INVENTION

Figure 1:
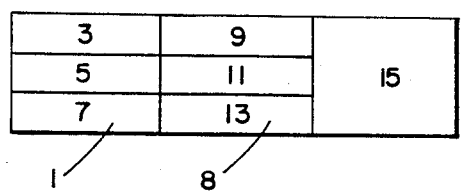
FIG. 1 is a schematic representation of a representative nonlinear device using bodies of the crystalline compounds of the invention as the active element.

The present invention is directed to certain organic complexes which can exhibit intense second harmonic generation (SHG), and to nonlinear optical devices, such as frequency doublers which incorporate crystalline bodies consisting essentially of these organic complexes. The present complexes are crystalline compounds of the formula:

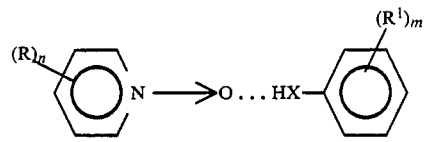

wherein n is about 0–5, m is about 0–5, $R^1$ is individually $-NO_2$, $-OR^2$, $-CN$, $-NR^2R^3$, $-CH_3$, halo, $-CO_2H$,

R is individually $-NO_2$, $-CH_3$, $-OR^2$, $-NR^2R^3$, $-CN$,

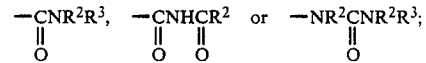

and X is $-N(R^2)-$, $-S-$,

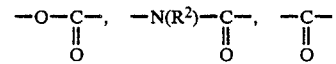

or $-C\equiv C-$; wherein $R^2$ and $R^3$ is individually H, ($C_1-C_5$)alkyl, aryl or ar($C_1-C_5$)alkyl; with the proviso that when m=n=1, $R^1$ is 4-$NH_2$ and X is

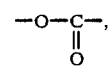

R cannot be 4-$NO_2$.

Preferably, each R is an electron-withdrawing group such as $NO_2$, most preferably 4-$NO_2$ and n and m are each about 1–2, preferably 1. The substituents $R^2$ and $R^3$ are preferably individually H or $CH_3$. The aryl or aralkyl group is preferably phenyl, tolyl, benzyl, phenethyl, xylyl, anisyl, 2-phenylethyl and the like, e.g., the phenyl group is preferably substituted with a ($C_1-C_3$)alkyl group or a ($C_1-C_3$)alkoxy group. Preferred halo substituents are Cl and Br.

Preferably, X is NH,

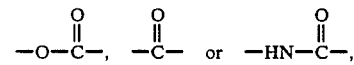

i.e., the moiety $HXAr(R^2)_m$ shown above is a substituted or unsubstituted aniline, benzoic acid, benzaldehyde, or benzamide, respectively.

Preferred $R^1$ groups include OH, CN, $NO_2$, $NH_2$, $CO_2H$ and/or $CO_2NH_2$. Especially preferred $R^1$ groups include CN and $NO_2$ (particularly when X is NH); or OH, $CO_2H$ and $CO_2NH_2$ (particularly where X is

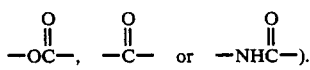

The present invention also includes crystalline compounds of the formula:

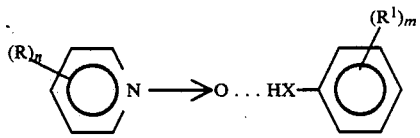

wherein n is about 0–5, m is about 0–5, $R^1$ is individually —$NO_2$, —$OR^2$, —CN, —$NR^2R^3$, —$CH_3$, —$CO_2H$, Cl, Br,

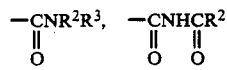

or —$NR^2CNR^2R^3$; R is individually, —$NO_2$, —$CH_3$, —$OR^2$, —$NR^2R^3$, —CN,

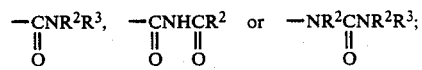

and X is —$N(R^2)$—, —S—, O,

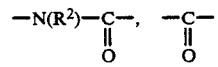

or —C≡C—; wherein $R^2$ and $R^3$ are individually H, ($C_1$–$C_5$)alkyl, aryl or ar($C_1$–$C_5$)alkyl; with the proviso that when m=n=1, R is 4-$NO_2$ and X is O, $R^1$ cannot be 3-$NO_2$, 4-OH or 3-Cl.

Preferably, X is O, and n and m are each about 1–2, most preferably 1. R is preferably an electron-withdrawing group such as $NO_2$, and most preferably is 4-$NO_2$. Preferred $R^1$ groups include OH and CN, most preferably 4-OH or 4-CN.

The method for the direct solid-state preparation of these compounds as cocrystalline powders is also within the scope of the present invention.

The present invention is also directed to a nonlinear optical device, comprising, in combination, a harmonic generating medium, means for introducing coherent radiation into said harmonic-generating medium, and means for utilizing the coherent radiation emitted from said medium, wherein said medium consists essentially of a crystalline body of a compound of the formula:

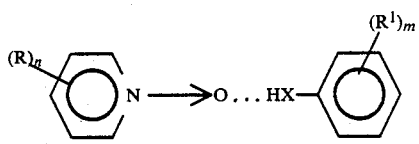

wherein n is about 0–5, m is about 0–5, $R^1$ is individually —$NO_2$, —$OR^2$, —CN, —$NR^2R^3$, —$CH_3$, —$CO_2H$,

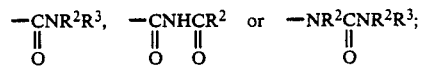

R is individually —$NO_2$, —$CH_3$, $OR^2$, —$NR^2R^3$, —CN,

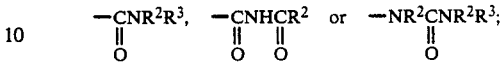

X is —O—, —S—, —$N(R^2)$—,

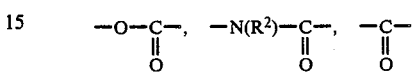

or —C≡C—; and wherein $R^2$ and $R^3$ are individually H, ($C_1$–$C_5$)alkyl, aryl or ar($C_1$–$C_5$)alkyl. Preferably, n and m are about 1–2, and the preferred "aryl" and "ar($C_1$–$C_5$)alkyl" are as defined hereinabove.

As used herein, the term "crystalline body" is intended to encompass the use of both single crystals and a plurality of crystals, e.g., a powder consisting essentially of at least one of the recited compounds. As used herein, the term "crystalline" indicates that a sample of a compound, whether a single crystal or a polycrystalline powder (homogeneous or heterogeneous), gives an x-ray diffraction pattern.

Preferably, the present device is employed to convert coherent optical radiation including a first frequency into coherent optical radiation including a second frequency, and this method of use of the present compounds is also within the scope of the invention. For example, preferred compounds of the invention can act as second harmonic generating media which double the frequency of the incident beam of coherent energy produced by a laser. The emitted beam of coherent energy, e.g., of light, has a frequency which is twice that of the introduced beam.

Therefore, other contemplated uses of the present compounds, which are within the scope of the invention include those listed on Table I, hereinabove. Therefore, the present compounds can be used in optical mixers, optical parametric oscillators and electro-optical modulators. The laser may be a Nd:YAG or a GaAs laser emitting optical radiation having a wavelength of about 1.0 and 0.8 μm, respectively. The means for utilizing the emitted energy may be a photodetector or an optical fiber. The means for introducing and for utilizing may also be prism couplers that introduce light from a laser into the harmonic-generating medium and extract light from the medium and direct it to a photodetector, optical fiber or other device. Preferred wavelengths for use in the present nonlinear optical devices using the present compounds as the harmonic generating media are between about 0.5 μm and 2.0 μm. The term "optical," as used herein, means wavelengths between visible and the near infrared.

DETAILED DESCRIPTION OF THE INVENTION

FIG. 1 is a schematic representation of a representative nonlinear device using a harmonic-generating medium consisting essentially of a crystalline body of a compound of the invention as the active element. Element 1 represents means for introducing coherent optical radiation into the harmonic-generating medium 8. Element 1 may be a solid state laser, a prism or an optically polished surface. Medium 8 can convert the incident coherent radiation including a first frequency into emitted coherent radiation including a second frequency. It is contemplated that for some device applications, either or both the incident and emitted radiation may have components at more than one frequency. For example, there may be three frequencies of coherent radiation with the phase-matching condition $\omega_3 n_3 = \omega_1 n_1 + \omega_2 n_2$, the energy conservation condition $\omega_3 = \omega_1 + \omega_2$ being satisfied. $\omega$ is the frequency, n is the refractive index and the subscripts 1, 2 and 3 refer to the lowest, middle and highest frequency, respectively. There may be two incident and one emitted wave or one incident and two emitted waves. Means for utilizing the coherent radiation 15 may be an optically transparent medium such as an optical fiber, a photodetector means, such as a prism, for extracting light from the active element, or an optically polished surface. If a prism is used, the light may be directed to further utilization means.

In the embodiment depicted, element 1 is a solid state laser having AlGaAs layer 3, GaAs layer 5 and AlGaAs layer 7. Other solid state lasers, such as Nd:YAG, can be used depending upon the wavelength of coherent radiation desired. Layer 5 is the active layer and the source of coherent optical radiation. Glass layers 9 and 13 are on the top and bottom, respectively, of layer 11 which is the active element of the medium and consists essentially of a crystalline body of a compound of the invention. The thickness of layer 11 is chosen to insure that the phase-matching condition is satisfied. The thickness of the layer will depend on the wavelengths of the coherent radiation and the refractive indices of layers 9 and 13.

For some purposes, prism coupling will be preferred to the edge-coupling embodiment depicted. A thin film configuration using prism coupling is described in U.S. Pat. No. 3,584,230, the disclosure of which is incorporated by reference herein. Two useful configurations of linear waveguides are disclosed in J. Zyss, *J. Molec. Electronics*, 1, 25, 33–40 (1985) at FIG. 4, the disclosure of which is incorporated by reference herein. A waveguide configuration may be obtained by growing a thin, approximately 1.0 $\mu$m, single crystal of a compound of the invention, using a liquid phase epitaxial growth method, such as the method disclosed in *J. Crystal Growth*, 42, 364–369 (1977).

Other embodiments of the nonlinear device using MNA are contemplated. For example, the devices might also be constructed with active element 8 consisting of bulk MNA crystals and phase-matched in well-known manner such as described in *Physical Review*, 145, 338–379 (1966) and in U.S. Pat. No. 3,965,375. Contemplated device applications are similar to those described for waveguide form devices.

Synthetic Methodology

The compounds of the present invention can be referred to as "mixed crystals" or "cocrystals" of the type X/Y, where X is a substituted pyridine-N-oxide and Y is an aromatic compound comprising a substituent which can hydrogen bond to the N-oxide moiety. It is believed that this intermolecular hydrogen bond assists in organizing the mixed crystal into the necessary acentric crystal structure.

The present compounds can be prepared either as single cocrystals from solution or can be obtained by mixing substantially equimolar amounts of the individual components of the cocrystal together under conditions of moderate pressure, as by grinding the components together in a mortar and pestle, optionally followed by moderate heating of the mixture.

When single crystals are analyzed for second harmonic generation (SHG), they are first reduced to the proper particle size. The preparation of single cocrystals from solution follows either known literature procedures or laboratory techniques which are commonly employed to grow crystals. One such technique employs the evaporation of solutions of approximately equimolar amounts of the individual components ("X" and "Y"), which have been preformed in a suitable organic solvent, such as toluene, acetonitrile, acetone or mixtures thereof.

Pyridine-N-oxide, 4-nitropyridine-N-oxide, 3-hydroxy-pyridine-N-oxide, 2-, 3-, and 4-methyl-pyridine-N-oxide and many other pyridine-N-oxides and substituted pyridines are commercially available, e.g., from Aldrich Chemical Co., Inc., Milwaukee, WI, or from Pfaltz & Bauer, Stanford, CT. N-oxides of pyridines can also be prepared by heating pyridine or a substituted pyridine with either hydrogen peroxide and acetic acid or with preformed peracetic acid. For example, 2.76 moles of 30% hydrogen peroxide are added with shaking to a solution of 2.15 moles of a methyl-substituted pyridine in 600 ml of acetic acid, the mixture is heated to complete the reaction and 500 ml of solvent is removed at reduced pressure. Then 200 ml of water is added and 200 ml of distillate is removed. The mixture is then made alkaline and the N-oxide is extracted with chloroform. In this manner, a 73–77% yield of 3-methyl-pyridine-N-oxide can be prepared by this route. (Taylor, Jr. et al., *Org. Syn. Coll. Vol.*, 4, 655 (1963)). Pyridine derivatives where R is —CONR$^2$R$^3$ can be prepared by the same methodology, e.g., nicotinamide-1-oxide has been prepared in 73–83% yield (E. C. Taylor, Jr. et al., *Org. Syn. Coll. Vol.*, 4, 704 (1963)). Basic hydrogen peroxide in acetonitrile/methanol can also be employed to form pyridine-N-oxide (G. B. Payne et al., *J. Org. Chem.*, 26, 651, 659 (1961)), as can peracetic acid (H. S. Musher et al., *Org. Syn. Coll. Vol.*, 4, 828 (1963)).

Likewise, the substituted anilines, benzoic acids, phthalamides, phthalic acids, benzaldehydes, phenols or benzamides encompassed by the formula HX—Ar(R$^1$)$_m$ are either commercially available, or can be readily prepared by synthetic methods available to the art.

Analysis of Second Harmonic Generation (SHG)

The crystalline compounds of the present invention are analyzed for SHG after reduction to powders of particle sizes of about 25–100$\mu$, employing urea as the SHG intensity standard. An about 5.0 mg sample of single cocrystals is ground with a ceramic mortar and pestle to a particle size of about 25–100$\mu$. The resultant powder is placed on a clean, scratch-free microscope slide and a small drop of Nujol (about 0.05 ml) is added to form a dispersion with the powder. Excess Nujol is removed with the corner of a tissue. A microscope cover slip is placed onto the sample and depressed to produce a circle of sample about 3 mm in diameter. The microscope slide is placed in the beam of a Kigre MK-20 Q-switched Nd:YAG laser ($\lambda$=1064 nm) approximately 5.5 cm from the exit port. Second harmonic generation can be viewed as a bright green emission (λ=532 nm) from the rear of the sample. If there was doubt as to whether or not the emission was seen, the sample was termed weak. If the sample seemed to have a more intense emission than the urea standard, it was classified as strong. If the emission seemed to be much brighter than our urea standard, it was defined as very strong.

TABLE II

Second Harmonic Analysis of Representative Starting Materials*

| Starting Material | Second Harmonic Signal |
|---|---|
| 4-nitropyridine-N-oxide | weak |
| 3-hydroxypyridine-N-oxide | no signal |
| 3-nitrophenol | very strong |
| 4-nitroaniline | no signal |
| 3-aminophenol | no signal |
| 4-nitrophenol | no signal |

*Prior to complexation

The invention will be further described by reference to the following detailed examples.

EXAMPLE 1

4-Nitropyridine-N-oxide/3-Aminophenol (1)

Single cocrystals of 4-nitropyridine-N-oxide/3-aminophenol were made according to the procedure of J. R. Lechat et al., *Acta Cryst.*, B37, 1468–1470 (1981).

The solid state method of preparing compound 1 involves grinding together approximately 20 mg of 4-nitropyridine-N-oxide (pale yellow, 0.14 mmol) and 20 mg of 3-aminophenol (white, 0.18 mmol) in a mortar and pestle until the powder size is about 10–25μ. The mixture starts to turn bright salmon 2–5 minutes after grinding has begun; eventually the powder becomes deep maroon as the starting materials are converted to the cocrystalline product. Following grinding, the mixture is allowed to stand for 24 hrs at room temperature or for 10 minutes in an oven at 80° C. The following data was taken on a mixture which was ground and then heated. Second harmonic analysis as described hereinabove reveals a strong signal for compound 1. The melting point of compound 1 taken on a Fischer-Johns apparatus was 93.5°–109.0° C.

EXAMPLE 2

4-Nitropyridine-N-oxide/4-Nitroaniline (2)

A saturated solution of 4-nitroaniline was made by heating 50 ml of acetone to boiling in a beaker on a hot plate and adding 4-nitroaniline with stirring until no more of the added solid dissolved. A saturated solution of 4-nitropyridine-N-oxide was made using the same method. About 25 ml of each saturated solution was filtered and subsequently mixed together. A solution of soapy water was made to use as a surfactant layer. A thin (1–2 mm) layer of 50%/50% v:v of soap and water solution was pipetted onto the top of the solution to prevent wicking of the solution up the sides of the beaker. The surfactant layer was used to improve the quality of crystals and does not affect the composition of the final product. The solution was left undisturbed for five days until crystals of 2 were isolated. The crystals of 2 were clear, bright red, and shaped like sword blades. The approximate size of these crystals was 2.00 mm×0.20 mm×0.05 mm. The melting point of a single crystal of 2 was 124.0°–126.0° C.

A crystal of 2 was mounted along its long axis for x-ray analysis. The space group and unit cell lengths for a crystal of 2 were found using a Super Weissenberg X-ray film camera with Cu Kα$\lambda$=1.5418 Å. An X-ray picture was taken as the crystal oscillates through 20° C., giving b=4.14 Å and revealing mirror symmetry about the b axis. Zero and first level Weissenbergs were also taken of the crystal through 180° C. to determine a=10.54 Å, c=20.21 Å, $\beta$=112.7° C. and volume of the unit cell=814.3 Å$^3$. Systematic extinctions and density calculations imply a space group of Pc.

A Nujol mull was prepared for IR analysis, which was executed on a Nicollet FTIR: 3480 cm$^{-1}$, 3373, 3090, 1600 and 1460. A solution NMR sample was prepared using d$_6$-acetonitrile. The sample is run on a 200 MHz automatic IBM FT-NMR: 5.23 ppm (1.00H, broad s, —NH), 6.40 (1.20H, d, -phenyl CH), 7.70 (1.20H, d, -phenyl CH), 8.10 (1.7H, m, -phenyl CH). A Nujol mull is prepared for UV-vis on a Shimadzu UV-160 spectrophotometer. A broad, poorly defined peak was observed from $\lambda$=300–500 nm. Second harmonic analysis of 2 was done using the standard procedure, yielding a strong signal.

A cocrystalline sample of compound 2 was made using the solid-state reaction technique employed in Example 1. When 4-nitroaniline (dark yellow) was ground with 4-nitropyridine-N-oxide (pale yellow), the product became deep orange as the reaction proceeded. The following data were gathered on the cocrystalline material which was prepared by grinding and heating. The melting point of compound 2 was 117°–129.0° C. The powder had a broader melting point than the crystal since it was not converted in 100% yield to product. It is expected that the m.p. of the powder will then be the same as that of the single crystal. An x-ray powder pattern was taken on a Siemens D500 diffractometer from 2$\theta$=10°–70° C. at Cu Kα$\lambda$=1.542 Å and gave the following characteristic peaks 2.786 (20.1%), 3.276 (22.1%), 3.336 (46.7%), 3.450 (13.8%). Compound 2 was prepared for second harmonic analysis using the standard method. The signal intensity was comparable to that of the single crystal of 2.

EXAMPLE 3

3-Hydroxypyridine-N-oxide/4-Nitrophenol (3)

A cocrystalline sample of 3-hydroxypyridine-N-oxide/4-nitrophenol was prepared using the solid-state reaction method of Example 1, except a WIG-L-BUG with a stainless steel mortar canister and ball bearing pestle was used in place of the ceramic mortar and pestle. Materials ground in this manner have particle sizes of 5–10μ. The mixture was then left in the oven in a covered beaker at 70° C. overnight, to yield white cocrystals of compound 3.

Second harmonic analysis of compound 3 using the standard method revealed a very strong signal. The melting point of compound 3 is 138.5°–149.0° C. It was slightly broadened due to a small amount of unreacted starting material. A Nujol mull was made of compound 3 and the FTIR was taken giving the following strong peaks: 3120(s), 2400–2730(b), 1600(s), 1580(s), 1480 (two sharp peaks), 1320 (many peaks overlapping m), 1300(s), 1230(s), 1150(s), 1100 (two sharp peaks), 1000(s), 850(s), 760 (many sharp peaks overlapping), 670(s). The alcohol (—OH) peak, normally found above 3000 cm$^{-1}$, was unexpectedly absent.

EXAMPLE 4

3-Hydroxypyridine-N-oxide/3-Nitrophenol (4)

A cocrystalline compound of 3-hydroxypyridine-N-oxide/3-nitrophenol (4) was prepared using the solid-state reaction method used for compound 1. The product formed was yellow. A compound was prepared for second harmonic analysis using the general method; the signal from compound 4 was strong. The melting point of compound 4 was 123.5°–126.0° C., an exceedingly sharp melting point, indicating that the starting materials had completely reacted. A Nujol mull of compound 4 was made for FTIR and the following strong peaks are found: 3066 cm$^{-1}$(s), 2400–2700 (broad set of peaks), 1580(s), 1530(s), 1260(s), 1230 (two sharp peaks), 1140(s), 1080(s), 980(s), 870 (two sharp peaks), 810(s), 750(s), 720(s) and 660(s). The alcohol (—OH) peak normally found above 3000 cm$^{-1}$, is unexpectedly absent.

Table II summarizes the physical properties of a series of cocrystals of general formula X/Y, wherein X is 4-nitropyridine-N-oxide; and compound Y is named on the table. These cocrystals exemplify known and novel compounds which would be expected to be useful in nonlinear optical devices such as those discussed hereinabove.

The Spot Test is a quick way to detect cocrystal formation. Acetonitrile solutions of 4-nitropyridine-N-oxide and of each donor compound (Y) were prepared. A few drops of the 4-nitropyridine-N-oxide solution and the solution of compound Y were mixed in the well of a spot plate and color changes were noted. Melting points also indicate cocrystal formation. Broad mp ranges are generally characteristic of mixtures, and narrow ranges of complexes. Melting points were taken by melting, then cooling and remelting the mixture to a constant mp. This procedure allowed some annealing of the materials to take place.

TABLE III

| | Formation of Cocrystals with 4-Nitropyridine-N-oxide (X) | | |
|---|---|---|---|
| Compound Y (Color) | MP of Compound Y (°C.) | MP of PPT X/Y (°C.) | Spot Test (Color Change) |
| 3-Aminophenol(1)[1] (white) | 119.0–119.5 | 101.0–106.0 | Yes (maroon) +SHG[5] |
| Hydroquinone*[2] (white) | 169.0–170.0 | 122.0–125.0 | Yes (orange) |
| 4-Aminobenzoic acid[3] (white) | 180.0–189.0 | 148.0–157.0 | Yes (yellow/orange) |
| 3-Cholorophenol[4] 4-Nitroaniline (bright yellow) | 144.0–147.0 | 113.0–120.0 | Yes |
| 3-Nitroaniline (bright yellow) | 109.0–110.0 | 158.0–159.0 | No +SHG |
| 4-Hydroxybenzoic acid (white) | 214.5–215.5 | 117.0–121.5 | Yes (yellow/orange) |
| 4-Aminobenzonitrile (white) | 83.0–85.0 | 57.0–61.0 | Yes (pale orange) +SHG |
| 4-Hydroxybenzonitrile (white) | 110.0–113.0 | 72.0–73.0 | Yes (bright yellow) |
| Hydroquinone* (new polymorph) | 169.0–170.0 | 112.0 | Yes (red) |
| 1,3-Phenylenediamine*** | 64.0–66.0 | — | Yes (deep red) |
| 4-Aminophenol | 169.0–170.0 (decomp.) | 112.0–150.0 | Yes (tan, turns bright red as it melts) |
| Phthalic acid (white) | 210.0 (decomp.) | 151.0–156.0 | Yes (yellow) |
| Phthalamide (white) | 160.0 Ca. (sublimes) | 133.0–140.0 | No |
| 2,4-Dihydroxybenzaldehyde (peach) | 132.0–133.5 | 84.0–87.0 | Yes (bright yellow/slightly orange) |
| 2,4-Dihydroxybenzoic acid (white) | 229.0–229.5 | Separates into two phases after 1st melt: 126.0–129.0 and 136.0–142.0 | Yes (yellow) |
| 2,6-Dihydroxybenzoic acid (off-white) | 159.0–163.0 | 119.0–123.0 | Yes (yellow) |

[1] J. R. Lechat et al., Acta. Cryst., B37, 1468 (1981).
[2] M. Shiro et al., Chem. Letters, 1151 (1972).
[3] J. R. Lechat et al., Acta Cryst., A40, C264 (1984).
[4] ibid.
[5] Second harmonic response in SHG analysis (urea standard).
*Hydroquinone can form al 1:1 or a 1:2 complex with 4-nitropyridine-N-oxide. The 1:2 complex has been reported in the literature, but the other is not known. The two very differently colored precipitates may represent the two different complexes.
***There is no mp for this complex because it does no precipitate.

The invention has been described with reference to various specific and preferred embodiments and techniques. However, it should be understood that many variations and modifications may be made while remaining within the spirit and scope of the invention.

What is claimed is:

1. A crystalline compound of the formula:

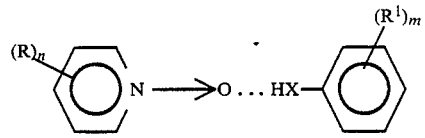

wherein n is 0–5, m is 0–5, R$^1$ is individually —NO$_2$, —OR$^2$, —CN, —NR$^2$R$^3$, —CH$_3$, —CO$_2$H, halo,

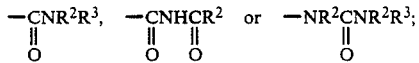

R is individually, —NO$_2$, —CH$_3$, —OR$^2$, —NR$^2$R$^3$, —CN,

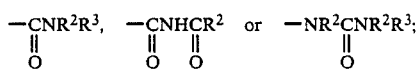

and X is —N(R$^2$)—, —S—,

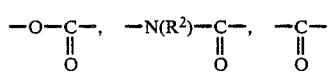

or —C≡C—; wherein $R^2$ and $R^3$ are individually H, $(C_1-C_5)$alkyl, aryl or ar$(C_1-C_5)$alkyl; with the proviso that when m=n=1, $R^1$ is 4-$NH_2$ and X is

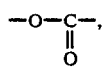

R cannot be 4-$NO_2$.

2. The compound of claim 1 wherein R is $NO_2$.
3. The compound of claim 2 wherein n is 1 and R is 4-$NO_2$.
4. The compound of claim 1 wherein $R^2$ is H or $CH_3$.
5. The compound of claim 4 wherein $R^2$ and $R^3$ are individually H or $CH_3$.
6. The compound of claim 5 wherein $R^2$ and $R^3$ are H.
7. The compound of claim 1 wherein X is —NH—,

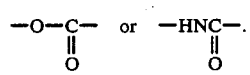

8. The compound of claim 7 wherein $R^1$ is $NO_2$.
9. The compound of claim 1 wherein $R^1$ is —OH, $CO_2H$ or $CONH_2$ and n is 1–2.
10. The compound of claim 9 wherein X=

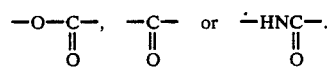

11. The compound of claim 10 wherein R is 4-$NO_2$.
12. The compound of claim 7 wherein $R^1$ is CN or $NH_2$ and n=1.
13. A crystalline compound of the formula:

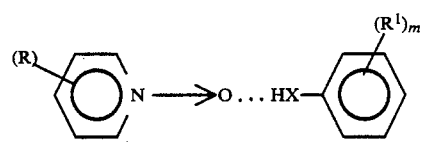

wherein m is 1–2, R is $NO_2$, $R^1$ is individually H, $NO_2$, CN, $NH_2$, $CO_2H$ or OH and X is NH,

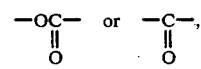

with the proviso that when m=1, $R^1$ is 4-$NH_2$ and X is

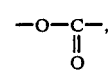

R cannot be 4-$NO_2$.

14. The compound of claim 13 wherein m is 1.
15. The compound of claim 13 wherein R is 4-$NO_2$.
16. The compound of claim 13 wherein $R^1$ is 4-$NO_2$ or 3-$NO_2$.
17. The compound of claim 16 wherein X is NH.
18. The compound of claim 13 wherein $R^1$ is OH or $CO_2H$.
19. The compound of claim 18 wherein X is

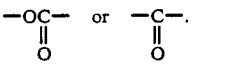

20. The compound of claim 13 wherein $R^1$ is $CO_2NH_2$ and X is

21. The compound of claim 13 wherein $R^1$ is $NH_2$ or CN.
22. The compound of claim 21 wherein X is NH.
23. The compound of claim 22 wherein R is 4-$NO_2$.
24. A crystalline compound of the formula:

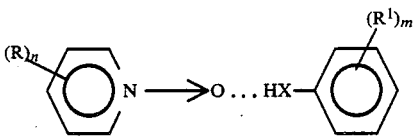

wherein n is 0–5, m is 0–5, $R^1$ is individually —$NO_2$, —$OR^2$, —CN, —$NR^2R^3$, —$CH_3$, —$CO_2H$, Cl, Br,

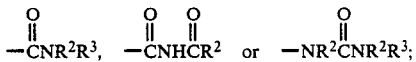

R is individually —$NO_2$, —$CH_3$, —$OR^2$, —$NR^2R^3$, —CN,

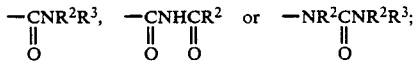

and X is —N($R^2$)—, —S—, O,

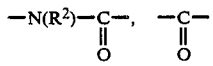

or —C≡C—; wherein $R^2$ and $R^3$ are individually H, $(C_1-C_5)$alkyl, aryl or ar$(C_1-C_5)$alkyl; with the proviso that when n=m=1, R is 4-$NO_2$, and X is 0, $R^1$ cannot be 3-$NH_2$, 4-OH or 3-Cl.

25. The compound of claim 24 wherein n is 1–2.
26. The compound of claim 24 wherein R is $NO_2$.
27. The compound of claim 24 wherein $R^2$ is H or $CH_3$.
28. The compound of claim 24 wherein X is 0.
29. The compound of claim 24 wherein X is 0 and R is 4-$NO_2$.
30. The compound of claim 25 wherein $R^1$ is OH.
31. The compound of claim 30 wherein X is 0.
32. The compound of claim 25 wherein $R^1$ is CN.
33. The compound of claim 32 wherein X is 0.
34. A crystalline compound of the formula:

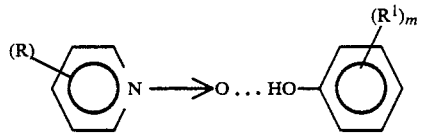

wherein R is $NO_2$, m is 1–2, and $R^1$ is H, OH, CN or $NH_2$.

35. The compound of claim 34 wherein R is 4-$NO_2$.
36. The compound of claim 35 wherein $R^1$ is 4-OH or 4-CN.

* * * * *